Figure 1:
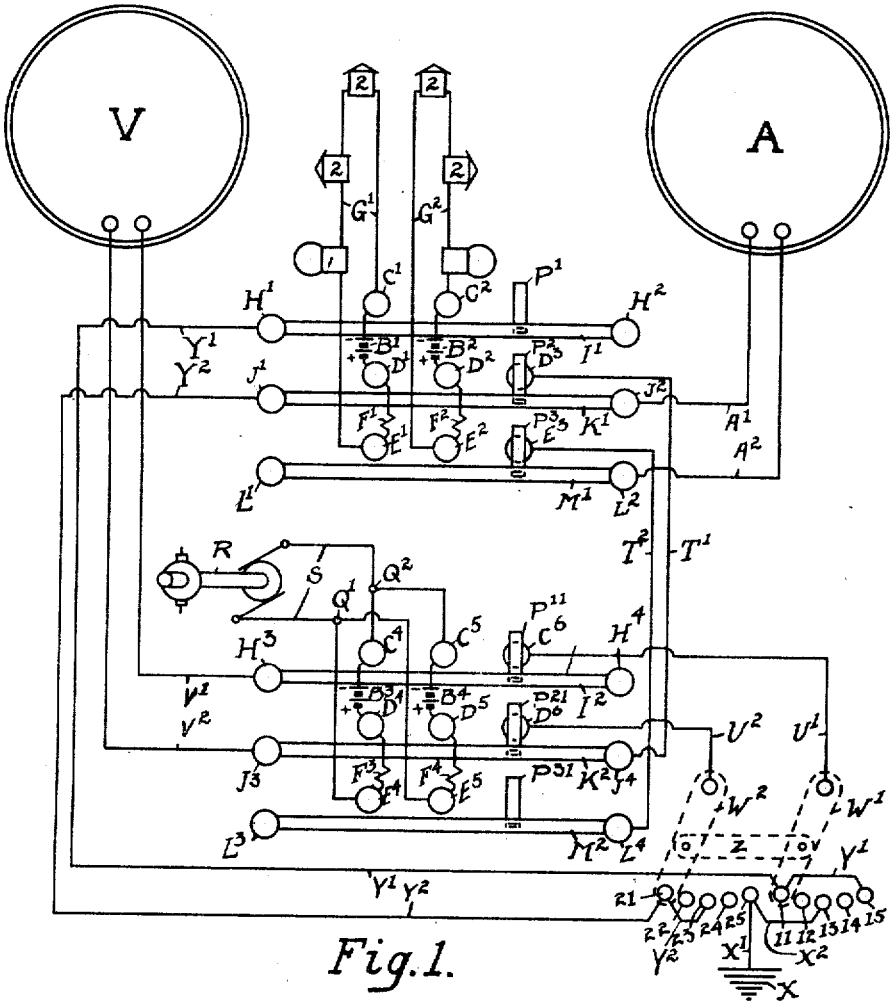

C. E. BEACH.

APPARATUS FOR TESTING STORAGE BATTERY CIRCUITS.

APPLICATION FILED OCT. 26, 1914.

Reissued Jan. 5, 1915. 13,858.

WITNESSES:

A. C. Palmatier

M. L. Thomas

INVENTOR

C. E. Beach

UNITED STATES PATENT OFFICE.

CLARENCE E. BEACH, OF BINGHAMTON, NEW YORK, ASSIGNOR TO GEORGE O. KNAPP, OF NEW YORK, N. Y.

APPARATUS FOR TESTING STORAGE-BATTERY CIRCUITS.

13,858. Specification of Reissued Letters Patent. Reissued Jan. 5, 1915.

Original No. 1,099,909, dated June 16, 1914, Serial No. 583,652. Application for reissue filed October 26, 1914. Serial No. 868,789.

*To all whom it may concern:*

Be it known that I, CLARENCE E. BEACH, a citizen of the United States, residing at Binghamton, in the county of Broome and State of New York, have invented certain new and useful Improvements in Apparatus for Testing Storage-Battery Circuits, of which the following is a specification.

My invention relates to storage battery systems, and contemplates an arrangement whereby measuring instruments may be connected for testing the batteries and whereby such instruments are duly protected during such testing.

In storage battery systems to which my invention is particularly applicable one or more sets of storage batteries are discharging and providing current for circuits to be supplied, while one or more other sets of batteries are being recharged.

Among the important objects of my invention are to provide improved switching mechanism and circuit arrangement for enabling suitable measuring instruments to be readily and quickly associated in various ways with the batteries to test the condition of the batteries and the circuits connected therewith and controlled thereby, and to provide such switching mechanism and circuit arrangement that such testing may be safely accomplished and so that the instruments will not be subjected to harmful current flow. In testing systems of this class a voltmeter and ammeter are usually employed for testing the conditions of the batteries and the circuits connected therewith, and among such tests it becomes desirable to connect the voltmeter with the batteries and with the ground. The voltmeter employed usually has a measuring capacity substantially the same as, or not much greater than, the maximum voltage output of the batteries, but in charging the batteries they are frequently charged from a circuit of much higher potential, which circuit may have one side normally grounded, or the batteries are connected with external circuits whose conductors are apt to come in contact with high voltage foreign circuits. Under such conditions it is very important that provision be made to prevent connection of the voltmeter between ground and any terminal of the batteries which are being charged, for if such connection were made during a time that the charging circuit became grounded, very heavy current would flow through the voltmeter and injure or destroy it. It is equally important to prevent direct connection of any terminal of the charging batteries with ground, as the batteries when under such conditions become seriously injured or even destroyed, due to current flow therethrough either in excess quantity or in the wrong direction.

Another very important object of my invention is, therefore, to provide such switch mechanism and testing circuits that it will be impossible to connect any terminal of the charging batteries to ground either directly, or through the voltmeter.

Figure 2:
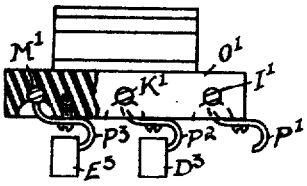
Figure 3:
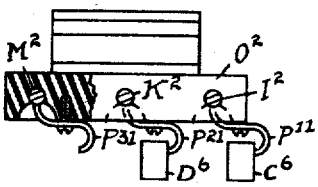
Figure 4:
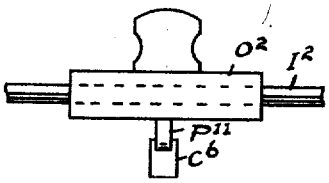

Referring to the accompanying drawings, Figure 1 is a diagrammatic plan view of the entire apparatus; Figs. 2 and 3 are end elevations, partly in section, of sliding contact-makers; and Fig. 4 is a side elevation of one of these contact-makers.

Referring to Fig. 1, $B^1$ and $B^2$ are storage batteries, the negative terminals of which are connected with the studs $C^1$ and $C^2$ respectively and the positive terminals with the studs $D^1$ and $D^2$ respectively. One end of an ammeter shunt $F^1$ is connected to the stud $D^1$, and the other end of said shunt is connected to the stud $E^1$. One end of another ammeter shunt $F^2$ is connected to the stud $D^2$, and the other end of said shunt $F^2$ is connected to the stud $E^2$. Circuits $G^1$ and $G^2$ containing signaling or other apparatus 2, 2, which represent fire alarm boxes of any usual construction, to be energized by the batteries, are connected between the studs $C^1$ and $E^1$ and the studs $C^2$ and $E^2$, respectively. Two posts $H^1$ and $H^2$ are so mounted as to support a horizontal rod $I^1$ in suitable relation to the studs $C^1$ and $C^2$. Corresponding posts $J^1$ and $J^2$ support the rod $K^1$ in similar relation to the studs $D^1$ and $D^2$, and the posts $L^1$ and $L^2$ support the rod $M^1$ in similar relation to the studs $E^1$ and $E^2$. A sliding block $O^1$ (Fig. 2) is mounted upon the rods $I^1$, $K^1$ and $M^1$, said rods being arranged parallel to each other and the holes through the block $O^1$ being of such size as to permit the block to slide freely upon the rods. Contact springs $P^1$, $P^2$ and $P^3$ are carried by the block $O^1$, one end of the spring $P^1$ being arranged to rest upon the rod $I^1$ and the other end of said spring $P^1$ to project in the path of the studs $C^1$, $C^2$ and contact with the rounded sides of said studs. The spring $P^2$ is similarly mounted with relation to the rod $K^1$ and the studs $D^1$, $D^2$ and $D^3$, and the spring $P^3$ is similarly mounted with relation to the rod $M^1$ and the studs $E^1$, $E^2$ and $E^3$. The studs C, D and E are arranged in parallel rows, the studs $C^1$, $C^2$ being in a line parallel to the rod $I^1$, the studs $D^1$, $D^2$ and $D^3$ in a line parallel to the rod $K^1$, and the studs $E^1$, $E^2$ and $E^3$ in a line parallel to the rod $M^1$. The distance from the stud $C^1$ to the stud $C^2$ is the same as the distance from the stud $D^1$ to the stud $D^2$ and that from the stud $E^1$ to the stud $E^2$. The distance between the studs $D^2$ and $D^3$, and $E^2$ and $E^3$ is likewise equal. The springs $P^1$, $P^2$ and $P^3$ are mounted in a line with one another on the insulating block $O^1$, so that said springs may simultaneously rest upon the respective studs $C^1$, $D^1$ and $E^1$, or the studs $C^2$, $D^2$, and $E^2$, or the studs $D^3$ and $E^3$, and thereby form electrical connections between the studs and the rods $I^1$, $K^1$, $M^1$, but the width of the springs $P^1$, $P^2$, and $P^3$ is such that they will not at any time bridge the space between any of their coöperating studs so that two studs would be electrically connected through any one of said springs.

Two other storage batteries $B^3$ and $B^4$ are connected to studs $C^4$, $D^4$, $C^5$ and $D^5$, and shunts $F^3$ and $F^4$ are connected to studs $E^4$ and $E^5$ in a manner similar to that already described with relation to the battery $B^1$ and shunt $F^1$. The studs $E^4$ and $E^5$ are connected to charging-current terminal $Q^1$, and the studs $C^4$ and $C^5$ are connected to the charging-current terminal $Q^2$. A motor generator R, or other suitable source of charging current, is connected to the studs $Q^1$ and $Q^2$ by means of the wires S. Rods $I^2$, $K^2$ and $M^2$ are mounted in suitable relation to the studs $C^4$ and $C^5$, said rods being mounted between the posts $H^3$ and $H^4$, the posts $J^3$ and $J^4$ and posts $L^3$ and $L^4$ respectively. A sliding block $O^2$ similar to the block $O^1$ is carried by these rods, said block being equipped with the springs $P^{11}$, $P^{21}$ and $P^{31}$. The path of the charging current from the generator R is through one of the wires S to the terminal $Q^1$, thence to the studs $E^4$ and $E^5$, through the shunts $F^3$ and $F^4$ to the studs $D^4$ and $D^5$, thence through the storage batteries $B^3$ and $B^4$, from the studs $C^4$ and $C^5$ to the terminal $Q^2$, and through the other wire S back to the generator R.

The stud $D^3$ mounted near the rod $K^1$ is connected by means of the wire $T^1$ with the post $J^4$, and the stud $E^3$ mounted near the rod $M^1$ is connected by means of the wire $T^2$ with the post $L^4$. A stud $C^6$ mounted near the rod $I^2$ is connected by means of the wire $U^1$ with the switch arm $W^1$, a stud $D^6$ mounted near the rod $K^2$ is connected by means of the wire $U^2$ with the switch arm $W^2$. The switch arms $W^1$ and $W^2$ are connected by means of the insulating yoke Z so that said arms will move in unison. Contact-points 11, 12, 13, 14 and 15 are mounted in the path of the switch arm $W^1$, and contact-points 21, 22, 23, 24 and 25 are mounted in similar relation with the switch arm $W^2$. The contacts 13 and 25 are respectively connected with the earth X by means of the wires $X^1$, $X^2$. The contacts 11 and 15 are connected with the post $H^1$ by means of the wires $Y^1$, and the contacts 21 and 23 are connected with the post $J^1$ by means of the wires $Y^2$.

A voltmeter V is provided, one terminal of which is connected with the post $H^3$ by means of the wire $V^1$, the other terminal being connected with the post $J^3$ by means of the wire $V^2$. An ammeter A is provided, one terminal of which is connected to the post $J^2$ by means of the wire $A^1$, the other terminal of said ammeter being connected to the post $L^2$ by means of the wire $A^2$. Said ammeter is so calibrated that when the posts $J^2$, $L^2$ are connected to the terminals of either of the shunts $F^1$, $F^2$, $F^3$ or $F^4$, the ammeter will indicate the volume of current passing through the shunt. While Fig. 1, as wired, requires the use of a "center zero" ammeter, the reversal of the wires $T^1$ and $T^2$ at the posts $J^4$ and $L^4$ adapts my invention for use with an end zero ammeter.

In using my invention, if it is desired to observe the voltage and amperage of the battery $B^1$, the sliding block $O^1$ is moved along the rods $I^1$, $K^1$ and $M^1$ until its spring $P^1$ connects the stud $C^1$ with the rod $I^1$, the spring $P^2$ then connecting the stud $D^1$ with the rod $K^1$ and the spring $P^3$ connecting the stud $E^1$ with the rod $M^1$; the sliding block $O^2$ is also moved along the rods $I^2$, $K^2$ and $M^2$ to a position where its contact spring $P^{11}$ will connect the stud $C^6$ with the rod $I^2$ and the spring $P^{21}$ will connect the stud $D^6$ with the rod $K^2$; and the switch arm $W^1$ is moved to a position where it rests upon the contact 11, thus bringing the switch arm $W^2$ to a position where it rests upon the contact 21. The voltmeter V will now indicate the difference of potential between the terminals $D^1$, $C^1$ of the battery $B^1$ by the following circuit:—stud $D^1$, spring $P^2$, rod $K^1$, post $J^1$, wire $Y^2$, switch contact 21, switch arm $W^2$, wire $U^2$, stud $D^6$, spring $P^{21}$, rod $K^2$, post $J^3$, wire $V^2$, voltmeter V, wire $V^1$, post $H^3$, rod $I^2$, spring $P^{11}$, stud $C^6$, wire $U^1$, switch arm $W^1$, contact 11, wire $Y^1$, post $H^1$, rod $I^1$, spring $P^1$, and stud $C^1$. The ammeter A also indicates the current flowing through the circuit $G^1$ and shunt $F^1$ by the following circuit:—stud $D^1$, spring $P^2$, rod $K^1$, post $J^2$, wire $A^1$, ammeter A, wire $A^2$, post $L^2$, rod $M^1$, spring $P^3$, and stud $E^1$.

If it is desired to determine the difference of potential between the positive terminal $D^1$ of the battery $B^1$ and the ground X, the switch arm $W^1$ is now moved so that it rests on contact 13, switch arm $W^2$ then resting on the contact 23. The circuit is then as follows:—stud $D^1$, spring $P^2$, rod $K^1$, post $J^1$, wire $Y^2$, contact 23, switch arm $W^2$, wire $U^2$, stud $D^6$, spring $P^{21}$, rod $K^2$, post $J^3$, wire $V^2$, voltmeter V, wire $V^1$, post $H^3$, rod $I^2$, spring $P^{11}$, stud $C^6$, wire $U^1$, switch arm $W^1$, contact 13, wires $X^2$ and $X^1$, ground X.

If it is desired to measure the difference of potential between the negative terminal $C^1$ of battery $B^1$ and the ground X, the switch arm $W^1$ is moved so that it rests on the contact 15, switch arm $W^2$ then resting on the contact 25. The circuit is then as follows:—stud $C^1$, spring $P^1$, rod $I^1$, post $H^1$, wire $Y^1$, contact 15, switch arm $W^1$, wire $U^1$, stud $C^6$, spring $P^{11}$, rod $I^2$, post $H^3$, wire $V^1$, voltmeter V, wire $V^2$, post $J^3$, rod $K^2$, spring $P^{21}$, stud $D^6$, wire $U^2$, switch arm $W^2$, contact 25, wire $X^1$, ground X. If the insulating block $O^1$ is now moved along on the rods $I^1$, $K^1$, $M^1$ until its springs $P^1$, $P^2$, $P^3$ rest upon the studs $C^2$, $D^2$, $E^2$, respectively, similar tests of battery $B^2$ may be made by corresponding manipulation of the switch arms $W^1$ and $W^2$.

To test the difference of potential between the terminals of the battery $B^3$, the insulating block $O^2$ is moved along the rods $I^2$, $K^2$ and $M^2$ until the contact springs $P^{11}$, $P^{21}$, $P^{31}$ rest against the studs $C^4$, $D^4$, $E^4$, respectively. The circuit is then as follows:—stud $D^4$, spring $P^{21}$, rod $K^2$, post $J^3$, wire $V^2$, voltmeter V, wire $V^1$, post $H^3$, rod $I^2$, spring $P^{11}$, stud $C^4$. It will be evident that as soon as the insulating block $O^2$ is moved away from the position where the brushes $P^{11}$, $P^{21}$ rest against the studs $C^6$, $D^6$, respectively, no manipulation of the switch arms $W^1$ and $W^2$ will connect the charging batteries $B^3$ or $B^4$, either through the voltmeter V, or directly, to the ground X.

It will be noted that, when the blocks $O^1$ or $O^2$ are moved along their supporting rods, all of the springs carried by said blocks will always break connection with one set of contact studs before any of said springs establish any connection with the contact studs of any other set, so that the movement of these blocks will not result in the establishment of any electrical connection between the various batteries, even through the measuring instrument.

If it is desired to indicate the current flowing through the battery $B^3$, the insulating block $O^1$ is now moved along the rods $I^1$, $K^1$ and $M^1$ to a position where the springs $P^2$ and $P^3$ are in contact with the studs $D^3$ and $E^3$, respectively, whereby the ammeter A is so connected that it measures the fall of potential across the shunt $F^3$. The circuit between the terminals of said shunt $F^3$ is then as follows:—stud $D^4$, spring $P^{21}$, rod $K^2$, post $J^4$, wire $T^1$, stud $D^3$, spring $P^2$, rod $K^1$, post $J^2$, wire $A^1$, ammeter A, wire $A^2$, post $L^2$, rod $M^1$, spring $P^3$, stud $E^3$, wire $T^2$, post $L^4$, rod $M^2$, spring $P^{31}$, stud $E^4$. Similar tests of battery $B^4$ may be made by moving the insulating block $O^2$ along the rods $I^2$, $K^2$ and $M^2$ to a position where the springs $P^{11}$, $P^{21}$, $P^{31}$ are in contact with the studs $C^5$, $D^5$, $E^5$, respectively.

Contacts 12, 14, 22 and 24 are provided so that the switch arm $W^1$ will not momentarily connect the wire $Y^1$ with wire $X^2$ when said switch arm is being moved between the contacts 11 and 15 and contact 13, and so that the switch arm $W^2$ will not momentarily connect the wire $Y^2$ with the wire $X^1$ when said switch arm $W^2$ is being moved between the contacts 23 and 25. This prevents the ground X being connected to either terminal of any of the batteries except through the voltmeter V. These extra contacts also prevent the short-circuiting of the wires $Y^1$ and $Y^2$ during the movement of the switch arms which might otherwise occur, for example, if the contacts 14 and 24 were omitted and the switch arm $W^1$ established a connection between the contacts 13 and 15 when the switch arm $W^2$ established a connection between the contacts 23 and 25 while these arms were being moved from one set to the other set of these contacts. The same result can be obtained by keeping the contacts 11, 13 and 15 at such distance from each other that the switch arm $W^1$ cannot bridge between any of said contacts, and keeping the contacts 23 and 25 a like distance apart with relation to the switch arm $W^2$. I have however found it more convenient to provide the extra contacts shown, in order to prevent the switch arms catching between the contact studs on account of not being supported, as when such studs are omitted.

From the foregoing description it is clear that in my testing system the instruments can be quickly and readily connected for ascertaining the desired conditions of the batteries and circuits, but at the same time such adjustment of the switch mechanism is prevented as would allow the connection of any terminal of the charging batteries to ground either directly or through the voltmeter. The batteries may therefore be charged from high potential circuits which are normally grounded or which may become grounded at any time. Changes and modifications are of course possible which would still come within the scope of the invention, and I do not therefore desire to be limited to the precise construction and arrangement shown. In the claims I have referred for convenience to a "charging battery," by which is meant a battery which is receiving or has received a charge of electric energy from a suitable generator; and to a "discharging battery" by which is meant a battery connected in circuit with one or more devices, such as signal-boxes, or other devices for consuming electrical energy.

I claim:

1. In combination, a battery and work-circuit connected thereto, a separate battery and battery-charging circuit, a voltmeter, a ground connection, and means for coupling the voltmeter to opposite battery-terminals of either circuit and for grounding either battery-terminal of the work-circuit only through the voltmeter.

2. In combination, a series of batteries and work-circuits connected thereto, a separate series of batteries and battery-charging circuits, a voltmeter, a ground connection, and means for coupling the voltmeter to opposite battery-terminals of either circuit and for grounding either battery-terminal of any work-circuit only through the voltmeter.

3. In combination, a battery and work-circuit connected thereto, a separate battery and battery-charging circuit, an ammeter shunt in each circuit, a voltmeter, an ammeter, a ground connection, and means for coupling the voltmeter to opposite battery-terminals of either circuit, for grounding either battery-terminal of the work-circuit through the voltmeter, and for coupling the ammeter to the terminals of either shunt.

4. In combination, a series of batteries and work-circuits connected thereto, a separate series of batteries and battery-charging circuits, an ammeter shunt in each circuit, a voltmeter, an ammeter, a ground connection, and means for coupling the voltmeter to opposite battery-terminals of either circuit, for grounding either battery-terminal of any work-circuit through the voltmeter, and for coupling the ammeter to the terminals of either shunt.

5. In combination, a battery and work-circuit connected thereto, a separate battery and battery-charging circuit, an ammeter shunt in each circuit, a voltmeter, a voltmeter circuit having movable connections to the battery terminals of the charging-circuit, an ammeter, an ammeter circuit having movable connections to the shunt-terminals of the work-circuit, a ground connection, a polarity ground-switch, a circuit including said switch and movable connections for connecting the voltmeter through the movable connections of the charging circuit to the battery-terminals of the work-circuit and for grounding either battery-terminal of the work-circuit through the voltmeter, and a circuit including movable connections for connecting the ammeter through the movable connections of the work-circuit to the shunt-terminals of the charging-circuit.

6. In combination, a series of batteries and work-circuits connected thereto, a separate series of batteries and battery-charging circuits therefor, an ammeter shunt in each circuit, a voltmeter, a voltmeter circuit having movable connections to the battery terminals of the charging-circuits, an ammeter, an ammeter circuit having movable connections to the shunt-terminals of the work-circuits, a ground connection, a polarity ground-switch, a circuit including said switch and movable connections for connecting the voltmeter through the movable connections of the charging-circuits to the battery-terminals of either work-circuit and for grounding either battery-terminal of either work-circuit through the voltmeter, and a circuit including movable connections for connecting the ammeter through the movable connections of the work-circuit to the shunt-terminals of either charging-circuit.

7. In combination, a series of batteries and work-circuits connected thereto, a separate series of batteries and charging circuits therefor, an ammeter shunt in each circuit, three rods adjacent to the battery and shunt terminals of each work-circuit, three rods adjacent to the battery and shunt terminals of each charging circuit, a slider on each rod adapted to contact with either adjacent terminal at one side of said rod, a voltmeter, connections from said voltmeter to the rods of the charging-circuits adjacent to the battery-terminals, an ammeter, connections from said ammeter to the rods adjacent to the terminals of the work-circuit shunts, a pair of contacts adjacent to the terminals of the work-circuit shunts, connections between said contacts and the rods adjacent to the terminals of the charging-circuit shunts, a ground connection, a double-arm ground-switch, a pair of contacts adjacent to the terminals of the charging-circuit batteries, connections between said contacts and the arms of said switch, switch ground-contacts, contacts adjacent to said ground-contacts, and connections between said adjacent contacts and the rods adjacent to the terminals of the work-circuit batteries.

8. In combination, a series of batteries and work-circuits connected thereto and sliding connections to the terminals of said batteries; a polarity switch provided with a ground; a separate series of batteries and charging circuit therefor and sliding connections to the terminals of said charging batteries and said polarity switch; a voltmeter; and circuits including said voltmeter, polarity switch, and both said sliding connections.

9. In combination, a battery and work-circuit connected thereto, a set of circuit controlling devices having fixed members connected to the terminals of the battery and movable members arranged to engage said fixed members; a separate battery and charging circuit therefor, a second set of circuit controlling devices having fixed members connected to the terminals of said separate battery and an independent pair of fixed terminals and movable members arranged to engage said fixed members; a polarity switch provided with a ground and connected to said independent pair of terminals; a voltmeter connected to said last mentioned movable members; and circuit connections between the polarity switch and the first set of movable members whereby the voltmeter may be connected to both terminals of the work-circuit battery, or either terminal of the work-circuit battery may be grounded through the voltmeter.

10. In combination, a battery and work-circuit including an ammeter shunt connected thereto, a set of circuit controlling devices having fixed members connected to the terminals of said work-circuit shunt and an independent pair of fixed terminals and movable members arranged to engage said fixed members; an ammeter connected to said movable members; a separate battery and charging circuit therefor, including an ammeter shunt; a second set of circuit controlling devices having fixed members connected to the terminals of said charging circuit shunt and movable members arranged to engage said fixed members; and circuit connections between the last-mentioned movable members and the independent pair of fixed terminals whereby the ammeter may be connected across the shunt of the charging battery.

11. The combination with a voltmeter and a switch provided with a ground, of a battery, a circuit-controller having connections to the terminals of said battery, a second battery, a second circuit-controller having connections to the terminals of said second battery, said second circuit-controller having additional contacts independent of the terminals of the second battery, and circuits connecting the voltmeter with said second circuit-controller, circuits connecting the additional contacts of said second circuit-controller with the switch, and circuits connecting the switch with the first-mentioned circuit-controller, said circuit connections being so arranged that the voltmeter may be connected with the terminals of either battery or that either terminal of the first battery only may be grounded through the voltmeter.

12. In a storage battery system, the combination of a discharging battery, a charging battery, a voltmeter, a ground connection, means for connecting said voltmeter to the terminals of the discharging battery or between either terminal of the discharging battery and ground, and for disconnecting the connections to said discharging battery and to ground and, only when so disconnected, for connecting the voltmeter to the terminals of the charging battery.

13. In a storage battery system, the combination of a plurality of discharging batteries, a plurality of charging batteries, a voltmeter, a ground connection, means for connecting said voltmeter to the terminals of any discharging battery or between either terminal of any discharging battery and ground, and for disconnecting the connections to said discharging batteries and to ground, and, only when so disconnected, for connecting the voltmeter to the terminals of any charging battery.

14. In a storage battery system, the combination of a discharging battery, a charging battery, an ammeter shunt connected in series with each battery, an ammeter, a voltmeter, a ground connection, means for connecting the voltmeter to the terminals of the discharging battery, or between either terminal of the discharging battery and ground, or for disconnecting the connections between said discharging battery and ground and, only when so disconnected, for connecting the voltmeter to the terminals of the charging battery, and for connecting the ammeter to the terminals of either shunt.

15. In a storage battery system, the combination of a plurality of discharging batteries, a plurality of charging batteries, an ammeter shunt connected in series with each battery, a voltmeter, an ammeter, a ground connection, means for connecting the voltmeter to the terminals of any discharging battery, or between either terminal of any discharging battery and ground, or for disconnecting the connections to said discharging batteries and to ground and, only when so disconnected, for connecting the voltmeter to the terminals of any charging battery, and means for connecting the ammeter to the terminals of any shunt.

16. In a storage battery system, the combination of charging and discharging batteries, a measuring instrument, a ground connection, means whereby said measuring instrument may be operatively connected to said charging batteries or to said discharging batteries, and whereby said measuring instrument may be operatively connected to ground only when connected to said discharging batteries.

17. In a storage battery system, the combination of charging batteries, discharging batteries, a measuring instrument, switch mechanism, and circuits so controlled thereby as to connect said measuring instrument across the terminals of any discharging battery, to connect said measuring instrument between any terminal of any discharging battery and ground, and to open said connections and to connect said measuring instrument across the terminals of any charging battery only when said connections are opened.

18. In a storage battery system, the combination of charging and discharging batteries, a measuring instrument, a ground connection, switch mechanism and circuits so controlled thereby as to connect said measuring instrument with either battery or with the discharging battery only and ground and arranged to disconnect said ground connection before connecting said instrument to said charging battery.

19. In a storage battery system, the combination of charging and discharging batteries, a set of switch bars associated with each battery, a movable switch member for each set of switch bars for connecting said bars with the terminals of the associated battery, a measuring instrument connected with the switch bars associated with the charging battery, a ground switch constructed and arranged to be connected to the switch bars of the charging battery by the associated switch member only when said switch bars are disconnected from the terminals of the charging battery, and circuit connections between said ground switch and the switch bars of the discharging battery.

20. In a storage battery system, the combination of charging batteries, discharging batteries, switch mechanism for the charging batteries and switch mechanism for the discharging batteries, a ground switch, cross connections between said switch mechanisms, a voltmeter connected directly with the charging battery switch mechanism, and an ammeter connected directly with the discharging battery switch mechanism, said charging battery switch mechanism and said ground switch controlling the connection of the voltmeter with the discharging battery switch mechanism, and said discharging battery switch mechanism controlling the connection of the ammeter with the charging battery switch mechanism.

21. In a storage battery system, the combination of charging batteries and discharging batteries, switch mechanism for the discharging batteries comprising switch contacts and a switch member, switch mechanism for the charging batteries comprising switch contacts and a switch member, auxiliary switch mechanism connected with contacts of the charging battery switch mechanism, a voltmeter connected with contacts of the charging battery switch mechanism, said auxiliary switch mechanism being connected with contacts of the discharging battery switch mechanism, the switch member of said charging battery switch mechanism being constructed and arranged for alternate connection with the charging batteries and with the auxiliary switch mechanism.

22. In a storage battery system, the combination of charging batteries and discharging batteries, switch mechanism for the discharging batteries comprising switch contacts and a switch member, switch mechanism for the charging batteries comprising switch contacts and a switch member, auxiliary switch mechanism connected with contacts of the charging battery switch mechanism, a voltmeter connected with contacts of the charging battery switch mechanism, said auxiliary switch mechanism being connected with contacts of the discharging battery switch mechanism, the switch member of the charging battery switch mechanism being constructed and arranged in one position to disconnect the charging batteries from the contacts with which the voltmeter is connected and to connect such contacts with the auxiliary switch mechanism and said switch member arranged when in another position to cause entire disconnection of the voltmeter contacts from the auxiliary switch mechanism and connection of said voltmeter contacts with said charging batteries.

23. In a storage battery system, the combination of a charging battery and a discharging battery, switch mechanism for said charging battery comprising contacts and a switch member for inter-connecting such contacts, switch mechanism for the discharging battery comprising switch contacts and a switch member for inter-connecting such switch contacts, an auxiliary switch connected with contacts of the charging battery switch mechanism and with contacts of the discharging battery switch mechanism and having ground contacts, and a voltmeter directly connected with contacts of the charging battery switch mechanism, the switch member of said charging battery switch mechanism being constructed and arranged when moved into one position to entirely disconnect the voltmeter from the charging batteries and to connect the voltmeter with the auxiliary switch mechanism whereby upon adjustment of said auxiliary switch mechanism to its ground connection, the voltmeter will be in circuit to measure the potential between a terminal of the discharging batteries and ground, and upon adjustment of said charging battery switch member to another position the auxiliary switch mechanism will be entirely disconnected from the charging battery switch mechanism.

24. In a storage battery system, the combination of a charging battery and a discharging battery, switch mechanism for the discharging battery comprising switch contacts and a switch member for inter-connecting said contacts, switch mechanism for the charging battery comprising switch contacts and a switch member for inter-connecting said contacts, a voltmeter connected with contacts of the charging battery switch mechanism, auxiliary switch mechanism having contacts connected with contacts of the discharging battery switch mechanism and having also grounded contacts, said auxiliary switch mechanism being connected with contacts of the charging battery switch mechanism, said auxiliary switch mechanism being adjustable to connect either terminal of the discharging battery with ground through said voltmeter or to connect the discharging battery terminals with the contacts of the charging battery switch mechanism with which said auxiliary switch mechanism is connected, the switch member of said charging battery switch mechanism being constructed and arranged to entirely disconnect the charging battery terminals from the voltmeter contacts and to connect such contacts with the contacts connected with the auxiliary switch mechanism when in one position, and said switch member being constructed and arranged to entirely disconnect the auxiliary switch mechanism from the voltmeter contacts of the charging battery switch mechanism and to connect such contacts with the charging batteries when in another position.

25. In a storage battery system, the combination of a charging battery and a discharging battery, switch mechanism for the charging battery and switch mechanism for the discharging battery, said switch mechanisms being interconnected, and a voltmeter connected directly with the charging battery switch mechanism, the switch mechanism of the charging battery controlling the connection of the voltmeter with the charging battery and the switch mechanisms of both batteries controlling together the connection of the voltmeter with the discharging battery.

26. In a storage battery system, the combination of a charging battery and a discharging battery, switch mechanism for the charging battery and switch mechanism for the discharging battery, circuits interconnecting said switch mechanisms, a voltmeter connected directly with the charging battery switch mechanism, and an ammeter connected directly with the switch mechanism of the discharging battery, said charging battery switch mechanism controlling directly the connection of the voltmeter with the charging battery, the switch mechanism for the discharging battery controlling directly the connection of the ammeter with the discharging battery, and both switch mechanisms together controlling the connection of the voltmeter and ammeter with the discharging and charging batteries respectively.

27. In a storage battery system, the combination of a charging battery and a discharging battery, switch mechanism for the charging battery and switch mechanism for the discharging battery, a voltmeter connected with the switch mechanism of the charging battery, a circuit interconnecting said switch mechanisms, and auxiliary switch mechanism included in such interconnecting circuit and having ground contacts whereby either terminal of the discharging battery may be connected with ground through said voltmeter, said charging battery switch mechanism being adjustable to cause connection of the voltmeter with the interconnecting circuit whereby the potential between ground and either terminal of the discharging battery may be determined, such adjustment of the charging battery switch mechanism causing entire disconnection of the charging batteries from the voltmeter and from the interconnecting circuit.

28. In a storage battery system, the combination of a discharging battery connected with a discharging circuit, a charging battery connected with a charging circuit, switch mechanism for the discharging battery, switch mechanism for the charging battery, a voltmeter connected with the charging battery switch mechanism, an ammeter connected with the discharging battery switch mechanism, a circuit interconnecting said switch mechanisms, and auxiliary switch mechanism connected with such interconnecting circuit adapted to connect either branch thereof and thereby either terminal of the discharging battery to ground through said voltmeter, said charging battery switch mechanism being adjustable to cause connection of the voltmeter with the interconnecting circuit, and said discharging battery switch mechanism being adjustable to connect the discharging battery with the interconnecting circuit whereby the potential can be determined between either terminal of the discharging battery and ground, such adjustment of the discharging battery switch mechanism causing connection of the ammeter with the discharging battery circuit to simultaneously indicate the current flow through such circuit.

29. In a storage battery system the combination of a charging battery; a discharging battery; a voltmeter; an ammeter; with means for simultaneously connecting the voltmeter and ammeter with either the charging or discharging battery, or for simultaneously connecting the ammeter with the discharging battery and connecting said voltmeter between either terminal of the discharging battery and ground.

30. In a storage battery system, the combination of a discharging battery, a charging battery, a voltmeter, three switches, and conductors connecting said switches; said switches and conductors comprising means for connecting the voltmeter to the terminals of either battery or between either terminal of the discharging battery and ground; said switches and conductors being so constructed and arranged that in the operation of said switches all ground connections are completely broken before and during the establishment of any charging battery connection.

31. In a storage battery system, the combination of a discharging battery, a charging battery, a voltmeter, three switches, and conductors connecting said switches; said switches and conductors comprising means for connecting the voltmeter to the terminals of either battery or between either terminal of the discharging battery and ground; said switches and conductors being so constructed and arranged that in the operation of said switches each connection is completely broken before any part of another is established, and all ground connections are completely broken before and during the establishment of any charging battery connection.

32. In a storage battery system, the combination of a discharging battery, a charging battery, a voltmeter, three switches, and conductors connecting said switches; and conductors comprising means for connecting the voltmeter to the terminals of either battery or between either terminals of the discharging battery and ground; said switches and conductors being so constructed and arranged that in the operation of said switches the ground can be connected only to the voltmeter and that when a terminal of the voltmeter is connected to ground, the other terminal can be connected to a terminal of the discharging battery only.

33. In a storage battery system, the combination of a discharging battery, a charging battery, a voltmeter, three switches, and conductors connecting said switches; said switches and conductors comprising means for connecting the voltmeter to the terminals of either battery or between either terminal of the discharging battery and ground; said switches and conductors being so constructed and arranged that in the operation of said switches the charging battery cannot be connected to ground, nor to the voltmeter while the voltmeter is connected to ground.

34. In a storage battery system, the combination of a plurality of discharging batteries, a plurality of charging batteries, a voltmeter, three switches, and conductors connecting said switches; said switches and conductors comprising means for connecting the voltmeter to the terminals of any battery or between either terminal of any discharging battery and ground; said switches and conductors being so constructed and arranged that in the operation of said switches all ground connections are completely broken before and during the establishment of any charging battery connection.

35. In a storage battery system, the combination of a plurality of discharging batteries, a plurality of charging batteries, a voltmeter, three switches, and conductors connecting said switches; said switches and conductors comprising means for connecting the voltmeter to the terminals of any battery or between either terminal of any discharging battery and ground; said switches and conductors being so constructed and arranged that in the operation of said switches each connection is completely broken before any part of another is established, and all ground connections are completely broken before and during the establishment of any charging battery connection.

36. In a storage battery system, the combination of a plurality of discharging batteries, a plurality of charging batteries, a voltmeter, three switches, and conductors connecting said switches; said switches and conductors comprising means for connecting the voltmeter to the terminals of any battery or between either terminal of any discharging battery and ground; said switches and conductors being so constructed and arranged that in the operation of said switches the ground can be connected only to the voltmeter and that when a terminal of the voltmeter is connected to ground the other terminal can be connected to a terminal of a discharging battery only.

37. In a storage battery system, the combination of a plurality of discharging batteries, a plurality of charging batteries, a voltmeter, three switches, and conductors connecting said switches; said switches and conductors comprising means for connecting the voltmeter to the terminals of any battery or between either terminal of any discharging battery and ground; said switches and conductors being so constructed and arranged that in the operation of said switches the charging batteries cannot be connected to ground, nor to the voltmeter while the voltmeter is connected to ground.

38. In a storage battery system, the combination of a discharging battery, a charging battery, an ammeter shunt connected in series with each battery, a voltmeter, an ammeter, three switches, and conductors connecting said switches; said switches and conductors comprising means for connecting the voltmeter to the terminals of either battery and the ammeter to the terminals of the corresponding shunt or for connecting the ammeter to the terminals of the discharging battery shunt and the voltmeter between either terminal of the discharging battery and ground; said switches and conductors being so constructed and arranged that in the operation of said switches all ground connections are completely broken before and during the establishment of any charging battery connection.

39. In a storage battery system, the combination of a discharging battery, a charging battery, an ammeter shunt connected in series with each battery, a voltmeter, an ammeter, three switches, and conductors connecting said switches; said switches and conductors comprising means for connecting the voltmeter to the terminals of either battery and the ammeter to the terminals of the corresponding shunt or for connecting the ammeter to the terminals of the discharging battery shunt and the voltmeter between either terminal of the discharging battery and ground; said switches and conductors being so constructed and arranged that in the operation of said switches each connection is completely broken before any part of another is established, and all ground connections are completely broken before and during the establishment of any charging battery connection.

40. In a storage battery system, the combination of a discharging battery, a charging battery, an ammeter shunt connected in series with each battery, a voltmeter, an ammeter, three switches, and conductors connecting said switches; said switches and conductors comprising means for connecting the voltmeter to the terminals of either battery and the ammeter to the terminals of the corresponding shunt or for connecting the ammeter to the terminals of the discharging battery shunt and the voltmeter between either terminal of the discharging battery and ground; said switches and conductors being so constructed and arranged that when in the operation of said switches a terminal of the voltmeter is connected to ground the other terminal can be connected to a terminal of the discharging battery only.

41. In a storage battery system, the combination of a discharging battery, a charging battery, an ammeter shunt connected in series with each battery, a voltmeter, an ammeter, three switches, and conductors connecting said switches; said switches and conductors comprising means for connecting the voltmeter to the terminals of either battery and the ammeter to the terminals of the corresponding shunt or for connecting the ammeter to the terminals of the discharging battery shunt and the voltmeter between either terminal of the discharging battery and ground; said switches and conductors being so constructed and arranged that in the operation of said switches the charging battery cannot be connected to ground, nor to the voltmeter while the voltmeter is connected to ground.

42. In a storage battery system, the combination of a plurality of discharging batteries, a plurality of charging batteries, an ammeter shunt connected in series with each battery, a voltmeter, an ammeter, three switches, and conductors connecting said switches; said switches and conductors comprising means for connecting the voltmeter to the terminals of any battery and the ammeter to the terminals of the corresponding shunt or for connecting the ammeter to the terminals of any discharging battery shunt and the voltmeter between either terminal of the discharging battery and ground; said switches and conductors being so constructed and arranged that in the operation of said switches all ground connections are completely broken before and during the establishment of any charging battery connection.

43. In a storage battery system, the combination of a plurality of discharging batteries, a plurality of charging batteries, an ammeter shunt connected in series with each battery, a voltmeter, an ammeter, three switches, and conductors connecting said switches; said switches and conductors comprising means for connecting the voltmeter to the terminals of any battery and the ammeter to the terminals of the corresponding shunt or for connecting the ammeter to the terminals of any discharging battery shunt and the voltmeter between either terminal of the discharging battery and ground; said switches and conductors being so constructed and arranged that in the operation of said switches each connection is completely broken before any part of another is established, and all ground connections are completely broken before and during the establishment of any charging battery connection.

44. In a storage battery system, the combination of a plurality of discharging batteries, a plurality of charging batteries, an ammeter shunt connected in series with each battery, a voltmeter, an ammeter, three switches, and conductors connecting said switches; said switches and conductors comprising means for connecting the voltmeter to the terminals of any battery and the ammeter to the terminals of the corresponding shunt or for connecting the ammeter to the terminals of any discharging battery shunt and the voltmeter between either terminal of the discharging battery and ground; said switches and conductors being so constructed and arranged that when in the operation of said switches a terminal of the voltmeter is connected to ground the other terminal can be connected to a terminal of the discharging battery only.

45. In a storage battery system, the combination of a plurality of discharging batteries, a plurality of charging batteries, an ammeter shunt connected in series with each battery, a voltmeter, an ammeter, three switches, and conductors connecting said switches; said switches and conductors comprising means for connecting the voltmeter to the terminals of any battery and the ammeter to the terminals of the corresponding shunt or for connecting the ammeter to the terminals of any discharging battery shunt and the voltmeter between either terminal of the discharging battery and ground; said switches and conductors being so constructed and arranged that in the operation of said switches the charging batteries cannot be connected to ground, nor to the voltmeter while the voltmeter is connected to ground.

46. In a storage battery system, the combination of a discharging battery, a charging battery, a voltmeter, three switches, and conductors connecting said switches; the first switch comprising means for connecting the voltmeter to the terminals of the charging battery or to two conductors extending to the second switch; the second switch comprising means for connecting one conductor from the first switch to a conductor extending to the third switch or to ground, and for connecting the other conductor from the first switch to another conductor extending to the third switch or to ground; and the third switch comprising means for connecting the conductors from the second switch to the terminals of the discharging battery; said switches all being so constructed and arranged that circuit is opened in moving from any one position before circuit is closed in moving to an adjacent position.

47. In a storage battery system, the combination of a plurality of discharging batteries, a plurality of charging batteries, a voltmeter, three switches, and conductors connecting said switches; the first switch comprising means for connecting the voltmeter to the terminals of any charging battery or to two conductors extending to the second switch; the second switch comprising means for connecting one conductor from the first switch to a conductor extending to the third switch or to ground, and for connecting the other conductor from the first switch to another conductor extending to the third switch or to ground; and the third switch comprising means for connecting the conductors from the second switch to the terminals of any discharging battery; said switches all being so constructed and arranged that circuit is opened in moving from any one position before circuit is closed in moving to an adjacent position.

48. In a storage battery system, the combination of a discharging battery, a charging battery, an ammeter shunt connected in series with each battery, a voltmeter, an ammeter, three switches, and conductors connecting said switches; the first switch comprising means for connecting the terminals of the charging battery to the voltmeter and the terminals of the charging shunt to two conductors extending to the third switch, or for connecting the voltmeter to two conductors extending to the second switch; the second switch comprising means for connecting one conductor from the first switch to a conductor extending to the third switch or to ground, and for connecting the other conductor from the first switch to another conductor extending to the third switch or to ground; and the third switch comprising means for connecting the terminals of the discharging battery to the conductors from the second switch and the terminals of the discharging shunt to the ammeter, or for connecting the ammeter to the two conductors from the first switch; said switches all being so constructed and arranged that circuit is opened in moving from any one position before circuit is closed in moving to an adjacent position.

49. In a storage battery system, the combination of a plurality of discharging batteries, a plurality of charging batteries, an ammeter shunt connected in series with each battery, a voltmeter, an ammeter, three switches, and conductors connecting said switches; the first switch comprising means for connecting the terminals of any charging battery to the voltmeter and the terminals of the corresponding charging shunt to two conductors extending to the third switch or for connecting the voltmeter to two conductors extending to the second switch; the second switch comprising means for connecting one conductor from the first switch to a conductor extending to the third switch or to ground, and for connecting the other conductor from the first switch to another conductor extending to the third switch or to ground; and the third switch comprising means for connecting the terminals of any discharging battery to the two conductors from the second switch and the terminals of the corresponding discharging shunt to the ammeter, or for connecting the ammeter to the two conductors from the first switch; said switches all being so constructed and arranged that circuit is opened in moving from any one position before circuit is closed in moving to an adjacent position.

In witness whereof, I hereunto subscribe my name, this 24th day of October, A. D., 1914.

C. E. BEACH.

Witnesses:
R. C. PALMATIER,
M. L. THOMAS.

Corrections in Letters Patent Reissue No. 13,858.

It is hereby certified that in Letters Patent Reissue No. 13,858, granted January 5, 1915, upon the application of Clarence E. Beach, of Binghamton, New York, for an improvement in "Apparatus for Testing Storage-Battery Circuits," errors appear in the printed specification requiring correction as follows: Page 2, line 57, after the reference letter "$Q^1$", strike out the period and insert a comma; page 8, line 47, after the semicolon, insert the words *said switches;* same page, line 50, for the word "terminals," read *terminal;* and that the said Letters Patent should be read with these corrections therein that the same may conform to the record of the case in the Patent Office.

Signed and sealed this 9th day of February, A. D., 1915.

[SEAL.]

J. T. NEWTON,

*Acting Commissioner of Patents.*